United States Patent
Baublit (10) Patent No.: US 8,234,191 B1
(45) Date of Patent: Jul. 31, 2012

(54) SYSTEMS AND METHODS FOR APPLICATION PROCESSING

(75) Inventor: Michael Roger Baublit, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 598 days.

(21) Appl. No.: 12/030,243

(22) Filed: Feb. 13, 2008

Related U.S. Application Data (60) Provisional application No. 60/939,871, filed on May 24, 2007.

(51) Int. Cl.
*G06Q 40/00* (2006.01)
(52) U.S. Cl. ............................................ 705/35; 705/4
(58) Field of Classification Search ........... 705/4, 35–40
See application file for complete search history.

(56) References Cited

U.S. PATENT DOCUMENTS

| 7,765,115 | B1 * | 7/2010 | Davies et al. ..................... | 705/4 |
| 2004/0153337 | A1 * | 8/2004 | Cruze ............................... | 705/2 |

OTHER PUBLICATIONS

Hogarth, Michael A., Bansal, Sanket, Upadhyay, Abhijhat, Kunkel, Kevin, and Gobar, Glenna; "A Novel Voice Signature Method for Electronic Death Registration Systems"; Proc AMIA Symposium; 2005; p. 981.
Abramowitz, Beth S.; "Voice Signature With Strong Bindings"; MITRE Technology Program; 2003; pp. 1-9; Copyright 2003 The MITRE Corporation.
Anthony, Brannon D. and Hatfield, Patrick J.; "A Framework for Designing an Effective ESignature Process: Part II—Significant Risks and Possible Mitigants"; Insurance & Technology Online; May 19, 2004; pp. 1-3; http://www.insurancetech.com/news/showArticle.jhtml?articleID=20800084; Copyright 2007 CMP Media LLC.
"Voicebond Solution"; downloaded on Nov. 2, 2007; http://www.voicesignature.com/solution.php; Copyright 2006, Voice Signature LLC.

* cited by examiner

*Primary Examiner* — Thu Thao Havan
(74) *Attorney, Agent, or Firm* — Kilpatrick Townsend and Stockton LLP (57) ABSTRACT

Systems and methods for application processing are described herein. In some examples, a method may include receiving an oral indication from an applicant that is recorded which authorizes the performing of one or more operations intended to facilitate the underwriting of an insurance policy. The method may also include immediately underwriting, following the receipt of a recorded oral indication authorizing an operation to be performed.

21 Claims, 5 Drawing Sheets

SYSTEMS AND METHODS FOR APPLICATION PROCESSING

RELATED APPLICATIONS

The present application claims the benefit of U.S. Provisional Application No. 60/939,871 filed May 24, 2007.

TECHNICAL FIELD

This application relates to systems and methods that provide application processing.

BACKGROUND

Customers demand more of the products and services they use than ever before. They insist that the companies they deal with on a regular basis provide them greater and greater levels of information and access. These companies are configuring and operating more and more complex systems that are capable of delivering highly integrated services to those customers. Customers may choose companies that provide quicker resolution to their issues and requests. However, some products require intricate application processes. The customer has no knowledge of these intricate processes and still demands quicker fulfillment for all of their issues and processes.

SUMMARY

In an embodiment, a method of processing voice authorizations include processing an insurance policy application. receiving an oral indication from the applicant which is recorded, performing an operation authorized by the oral indication and underwriting the insurance policy. The method of recording the oral indication may be defined, in one example, by a regulatory agency.

In an embodiment, a method of providing instant insurance includes receiving an oral indication from an application authorizing an operation intended to facilitate the underwriting of an insurance policy and immediately underwriting the policy following the receipt of the oral indication.

In an embodiment, a method of processing an application for insurance includes receiving an indication to apply for an insurance policy, deriving one or more jurisdictional aspects, retrieving one or more script components, presenting the script components to a customer service representative (CSR) which are read by the CSR and recording the response of the applicant. The method may additionally include performing one or more operations authorized by the applicant's response, and underwriting the policy.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

Figure 1:
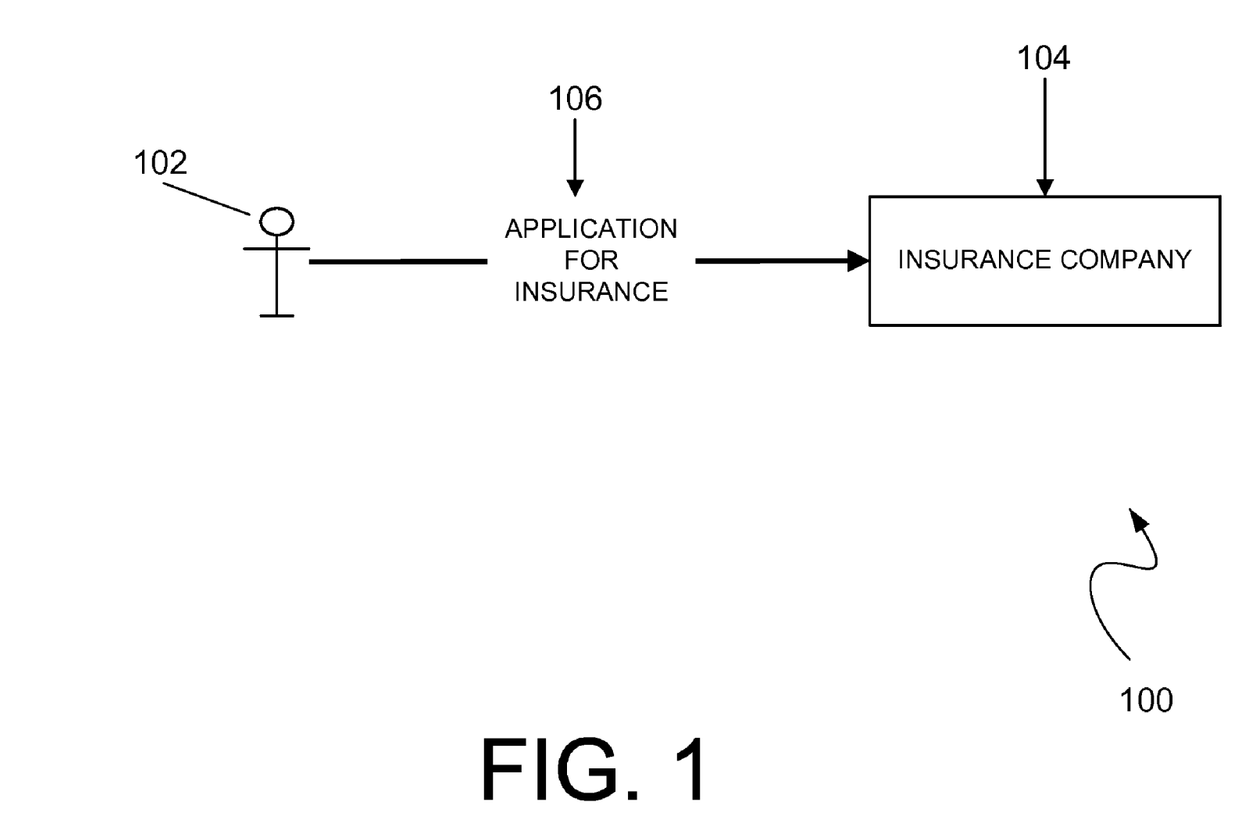
FIG. 1 shows a high-level block diagram of a system for providing insurance coverage to a customer, in accordance with an example embodiment.

FIG. 1 shows a high-level block diagram of a system for providing insurance coverage to a customer, in accordance with an example embodiment. The system 100 includes a customer 102 and an insurance company 104. The example of life insurance will be used to illustrate this example, but the systems and methods described herein have equal applicability to a variety of insurance products, as well as non-insurance products.

In the example of FIG. 1, the customer 102 desires to have life insurance coverage. They contact the insurance company 104 and request life insurance, shown as beginning the application 106 in FIG. 1. In order to comply with one or more legal requirements, the insurance company must provide paperwork to the customer 102, which requires execution by the customer. In some cases these legal requirements may be promulgated by a state or federal government, and may include statutory as well as regulatory requirements. The legal requirements may also include company requirements that the company adhere to that are intended to reduce future liability. One example of this latter type of legal requirement is a waiver in the case of a dangerous activity, such as bungee jumping. In the absence of such a waiver, which is not required by any government agency, the company may find itself liable for the physical injuries of the customer. The insurance company 104, in this example, provides one or more pieces of paperwork 108 to the customer 102. The paperwork requires a wet signature by the customer, in some examples. As used herein, a wet signature is a signature executed by the customer in ink. This may also include a signature that is performed in front of a notary, but is not limited to only such a signature. Following the execution of the signature, the customer returns the paperwork to the insurance company.

The paperwork delivered to the customer and executed by them authorizes the insurance company to perform one or more operations intended to facilitate the underwriting of an insurance policy for the customer. In the context of life insurance, this may include, but is not limited to, performing blood work, background investigations, credit checks, urinalysis, DNA analysis, and the like. Governmental entities, fearful of a loss of privacy for its citizens, may require explicit authorizations to perform these operations. A wet signature on the documents can satisfy these requirements. However, this takes time. During this time, in the example of life insurance, the customer remains uncovered by a life insurance policy. One method to provide piece of mind to the customer is to provide instant life insurance to the customer without regard to what is found by the performing of those operations. However, the insurance company will bear an unknown risk in the absence of that information.

After the operations are performed, the insurance policy can be properly quoted and the quote for the policy is communicated to the customer, who can either accept or decline the coverage based on the quoted premium. The time between the customer requesting the insurance and the final acceptance and issuance of the policy is typically measured in weeks and months. However, as discussed above, the customer demands more and when technology has enabled them to have instant gratification for a multitude of services and products, they can become confused as to why insurance takes longer. For the life insurance company, they bear some risk that the customer will stop the process at some point due to this delay. The insurance company loses a customer and the customer goes uncovered.

The systems and methods described herein may reduce the time period by providing the insurance company a way to satisfy the requirements of governmental organizations as well as the requirements of their customers. With respect to the wet signatures required on the paperwork delivered, the insurance company may perform a scripted interaction with the customer that satisfies the legal requirements of notice and consent with respect to their authorization. Through this scripted interaction, the insurance company is able to reduce the time period required to send the paperwork to the customer and receive the executed documents back from the customer. There may be instances where multiple authorizations are required, and some of those authorizations may be received through a scripted interaction. Additional authorizations may be received by wet signatures. The former authorizations operate to speed up the process with respect to them.

Figure 2:
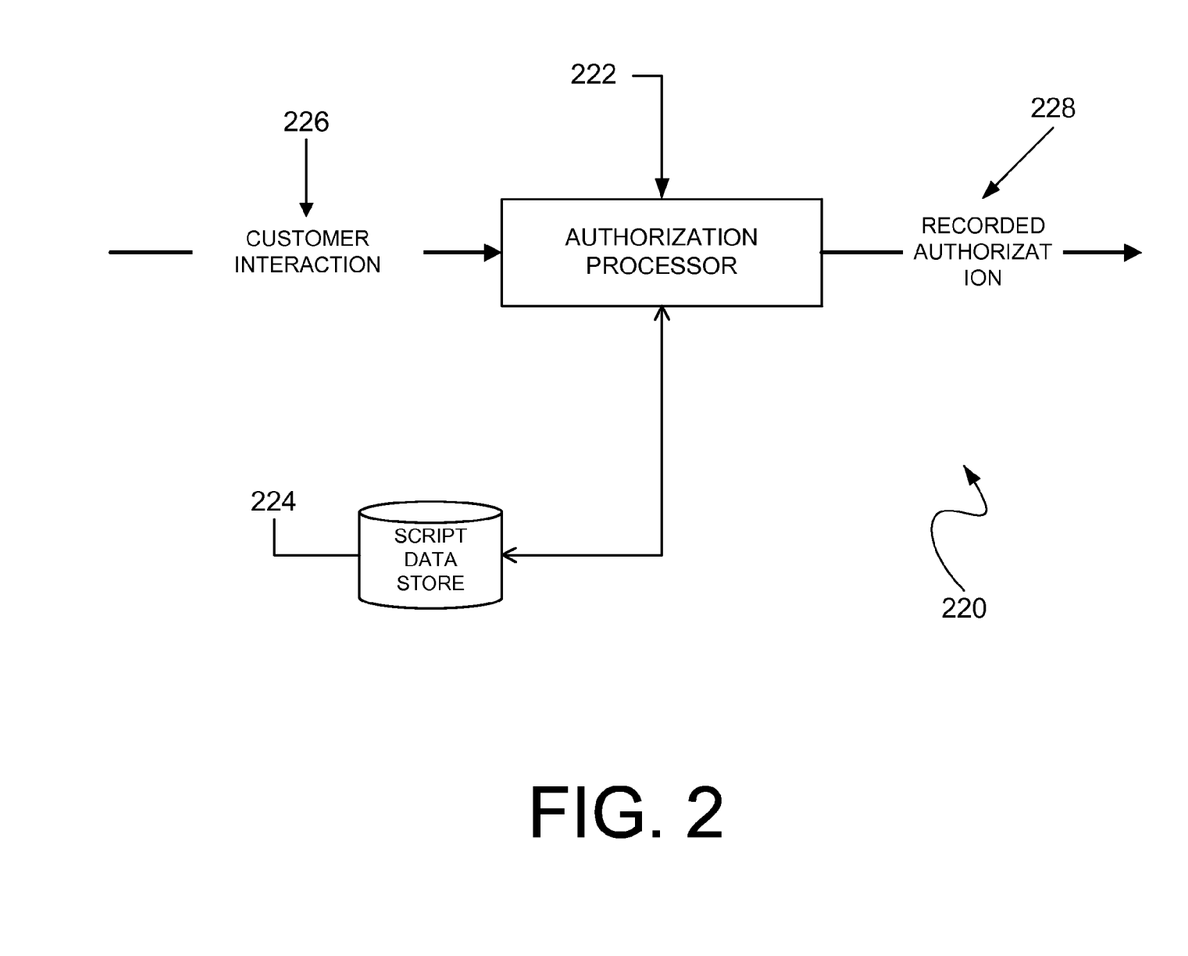
FIG. 2 shows a block diagram of an apparatus for receiving authorizations from a customer, in accordance with an example embodiment.

FIG. 2 shows a block diagram of an apparatus for receiving authorizations from a customer, in accordance with an example embodiment. The system 220 includes an authorization processor 222 coupled to a script data store 224. The authorization processor 222 receives a customer interaction 226 as an input and outputs a recorded authorization 228.

The customer interaction 226, may include in some examples, a voice interaction enabled through any suitable call center system. This may include, without limitation, a computer telephony interface (CTI) system. The voice interaction is an interaction between the customer and a customer service representative (CSR). The interaction, in this example, includes a request for insurance. This may be the first request for insurance, or may also be a follow-up phone call between the CSR and the customer. The follow-up phone call may be performed to satisfy the legal requirements for authorization of one or more operations intended to facilitate the underwriting of an insurance policy for the customer. The follow-up phone call may be in response to the customer initiating a request for insurance through other means, such as mailing in an application, or filling out a web-enabled form.

The authorization processor 222 retrieves one or more scripts from the script data store 224. Each of these scripts may be read by the CSR during the interaction with the customer. The interaction is recorded, and with respect to each of the authorizations required, a recorded authorization 228 is output and archived. The recorded authorization may be archived using any suitable archival method. Depending on legal or company requirements, the recorded authorization may be retained for any number of years. The authorization processor may record the entire interaction with the customer such that each of the authorizations are recorded in a single file. Alternately, the authorization processor may record each individual authorization separately. Each of the scripts maintained by the script data store 224, when spoken by the CSR and responded to by the customer, are intended to replace a wet signature. As such, they may be reviewed by some agency, such as a governmental entity. Following review, the agency permits the recorded authorization to take the place of a wet signature on a document.

Figure 3:
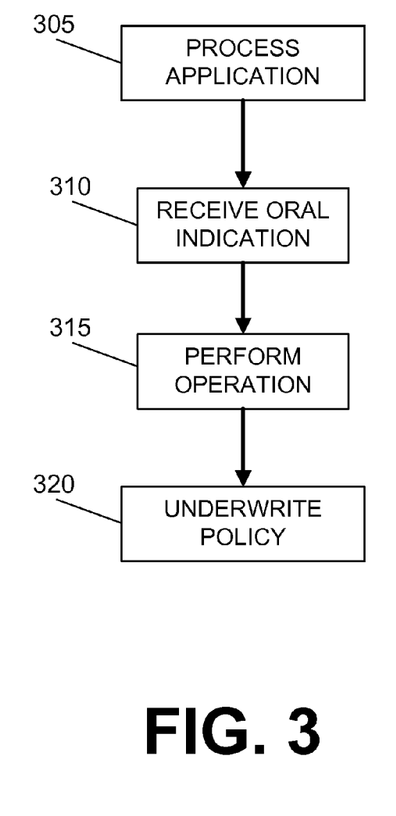
FIG. 3 shows a flowchart of a method for processing a voice authorization, in accordance with an example embodiment.

FIG. 3 shows a flowchart of a method for processing a voice authorization, in accordance with an example embodiment. The operations shown in FIG. 3 may be performed by, or in conjunction, the authorization processor shown above.

At block 305, an application for an insurance policy is processed. This may include, the initial request for the policy, or further processing to further the underwriting of the policy. The insurance policy may include, in some examples, a life insurance policy. At block 310, an oral indication is received from an applicant. This oral indication is an authorization to proceed with the insurance policy and may include, in some examples, the authorization to perform one or more operations that in the absence of the methods described herein, would require a wet signature on paperwork. The authorization is recorded and is intended to be sufficient to satisfy any regulatory requirements concerning that authorization. In furtherance of the intent, a script to be read by a CSR is reviewed and when performed by the CSR and responded to by the customer satisfies the legal requirement. This legal requirement may include a state legal requirement, a federal legal requirement, or some combination. The oral indication may be received during a voice interaction enabled through a public switched telephone network (PSTN), Voice over Internet Protocol (VoIP), voice enabled instant message and voice enabled web session, and the like. Other types of vocal interaction may be used without departing from the scope of the present discussion and any interaction where the intentions of the customer can be aurally recorded are considered within the scope of the present discussion.

The oral indication received at block 310 may be received synchronously with the reading of a script by the CSR, in one example. Alternately, the script may be read by a CSR and delivered asynchronously to the customer, such as through an audio recording delivered in an electronic message to the customer. The customer could respond, in this example, by recording their authorization and delivering that to the CSR. However, in this alternate example, the entity that authorized the script and recording of the customer's authorization would need to authorize this type of delivery to the customer and provision of their authorization.

At block 315, an operation intended to facilitate the underwriting of an insurance policy is performed. This operation performed at block 315 is specifically authorized by the oral indication received at block 310 and recorded. This recording may be archived and maintained for a pre-determined period of time, such as five or seven years, as further defined by applicable legal requirements. At block 320 the insurance policy is underwritten. The underwriting may use information obtained by the operation performed at block 315, in some examples.

Figure 4:
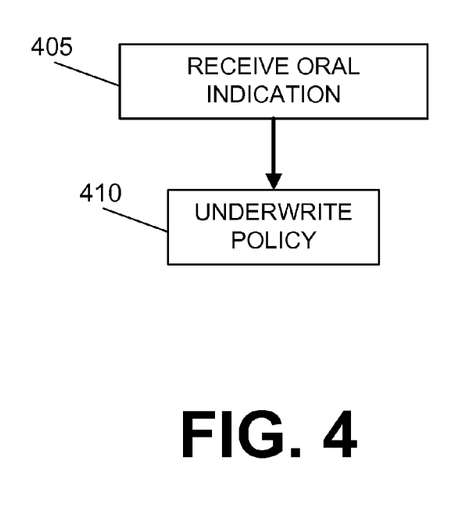
FIG. 4 shows a flowchart of a method for processing a voice authorization, in accordance with an example embodiment.

FIG. 4 shows a flowchart of a method for processing a voice authorization, in accordance with an example embodiment. The operations shown in FIG. 4 may be performed by, or in conjunction with, the authorization processor shown above.

At block 405, the processor receives an oral indication. This may be, in one example, during the processing of an insurance policy, which may include the initial application for insurance or for some interaction occurring after the initial application. The oral indication received from an applicant regards their authorization to perform at least one operation intended to facilitate the underwriting of the insurance policy. These operations may include, without limitation, blood analysis, urinalysis, credit check, background check, and the like. Authorization to proceed with some operations, such as those listed, may require a formal indication from the applicant to proceed. This may include a wet signature as discussed above. Or, the reading and recording of an approved script and the applicant's oral response using the systems and methods described herein, may be used to satisfy the requirement.

At block 410, an insurance policy is underwritten following the receipt of the oral indication at block 405. As discussed above, this results in some additional risks, but those risks are reduced by the applicant's willingness to agree to those operations needed to properly quote their insurance policy. This 'instant policy' may have a premium associated with it that is calculated by the applicant's personal data, such as age, sex, occupation and the like. Through that, the applicant can have the piece of mind that they are covered, and the insurance company can have a better assurance that the applicant is not going to go to another provider. The 'instant policy' may also include an expedited policy that is not underwritten immediately following the receipt of the oral indication at block 410. The 'instant policy' may alternately include a temporary policy which expires when the insurance policy originally applied for is issued, so that the 'instant policy' is only meant to provide insurance coverage to the applicant while the policy applied for is processed, in an example. In this example, the 'instant policy' and the policy applied for are separate policies. In an alternate example, the 'instant policy' is an expedited coverage under the policy applied for such that there is no temporary policy and then final policy.

The oral indication received at block 405 is intended to satisfy one or more legal requirements. A governmental agency or an internal company department, as discussed above can determine these one or more legal requirements. The recording of the oral indication is done in a form that is acceptable to the agency. This may include providing the agency with the script to be read by the CSR during the interaction, allowing the agency to approve it. It may also include retaining the recording for a period of time as determined by the agency. As underwriting may be a lengthy process, in some examples, the recording may be performed in parallel to the underwriting, such that the recording and storage of the indication is taking place while other systems perform one or more underwriting operations.

Figure 5:
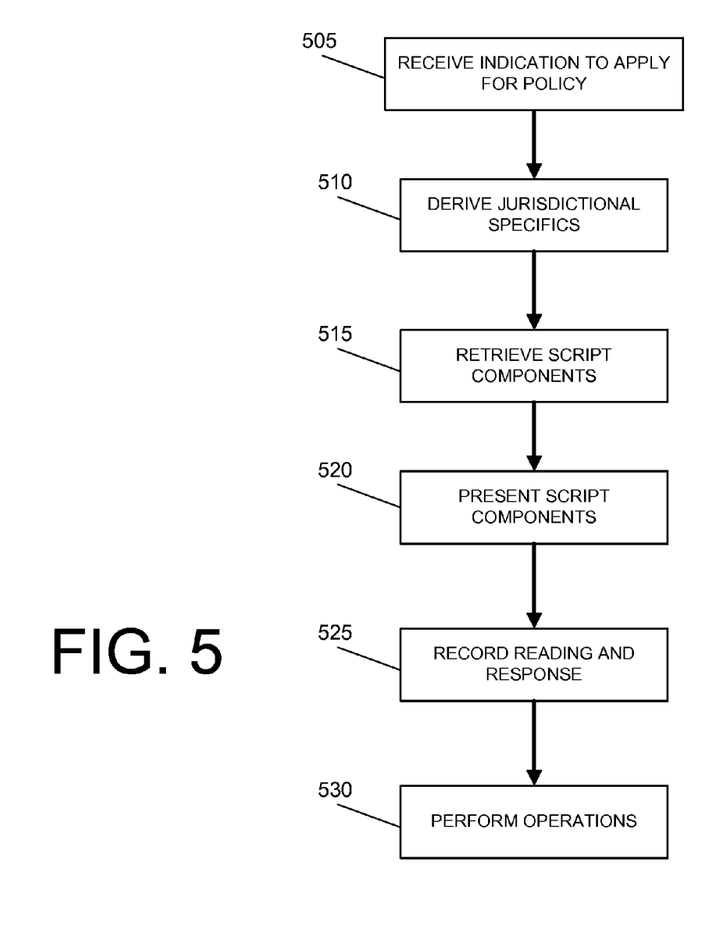
FIG. 5 shows a flowchart of a method for processing an application for an insurance policy, in accordance with an example embodiment.

FIG. 5 shows a flowchart of a method for processing an application for an insurance policy, in accordance with an example embodiment. Operations begin at block 505 with some indication from an applicant that they wish to apply for an insurance policy. Reference will be made herein to a life insurance policy, though the operations shown in FIG. 5 are not limited in any manner. The indication may be received through any suitable means, such as over a phone call, or through a web-enabled form. Additionally, the indication to apply for an insurance policy may be received while the applicant is being processed for an unrelated financial services product. Unrelated, in this context, denotes a product that is not an insurance product. However, the unrelated financial services product may implicate the need for an insurance policy, such as in the case of a home mortgage, which may require an increase in life insurance coverage.

At block 510 one or more jurisdictional specifics for the applicant are derived. This may include where the applicant resides or works. It may also include whether the policy applied for implicates state regulations, federal regulations, or some combination thereof. As discussed above the authorization to perform some operations intended to facilitate the underwriting of an insurance policy are governed by those regulations, as well as internal regulations of the insurance company. Using each of the one or more jurisdictional specifics derived at block 510, one or more script components can be retrieved at block 515. Using the operations at block 515, customized scripts can be retrieved, providing a differing script for each of a multitude of applicants. This can also cover the scenario where the applicant resides in a jurisdiction where voice authorizations are not permitted for some operations. Wet signatures can authorize those operations, while other authorizations that can be received orally can be done so.

At block 520, the one or more script components are presented to a CSR, who can read each of them to the applicant. The components are read during an interaction with the applicant. This interaction may take place following the indication received at block 505, or may take place at some time after. This may be the case where the applicant indicates their desire to apply for an insurance policy through a mail-in form or through a web-enabled form. In either of these cases, the interaction between the CSR and the applicant takes place after and not concurrent with the indication received at block 505.

At block 525, the reading and the applicant's response are recorded. The recording is intended to satisfy a legal requirement, in some examples. As discussed above the legal requirement may be state, federal, internal, or some combination thereof. The applicant's response as recorded may be an approval to proceed with one or more operations that are required to process the insurance policy. These operations are performed at block 530. The performance of these operations may include the ordering of one or more operations to be performed by a third party. One example may be blood analysis, where a third party is contracted with to draw blood from the applicant and report the results of the analysis to the insurance company. Through such a contract, the insurance company can focus on the actual processing of the application for insurances and allow the third party to perform some of the operations required to process the insurance policy.

Figure 6:
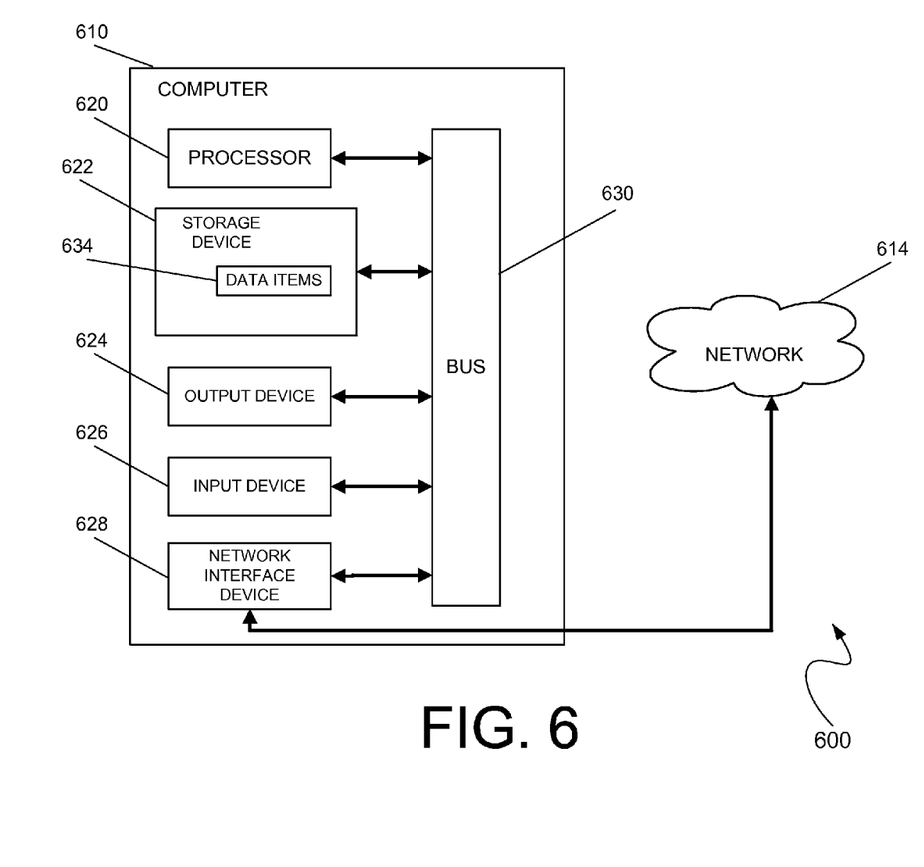
FIG. 6 shows a block diagram of a machine including instructions to perform any one or more of the methodologies described herein.

FIG. 6 shows a block diagram of a machine including instructions to perform any one or more of the methodologies described herein. A system 600 includes a computer 610 connected to a network 614. The computer 610 includes a processor 620, a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 614 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machinereadable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the functions, as previously described above with reference to FIGS. 1-6. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 614.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 614 through any suitable communications protocol. The network interface device 628 sends and receives data items from the network 614.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 614 may be any suitable network and may support any appropriate protocol suitable for communication to the computer 610. In an embodiment, the network 614 may support wireless communications. In another embodiment, the network 614 may support hard-wired communications, such as a telephone line or cable. In another embodiment, the network 614 may support the Ethernet IEEE (Institute of Electrical and Electronics Engineers) 802.3x specification. In another embodiment, the network 614 may be the Internet and may support IP (Internet Protocol). In another embodiment, the network 614 may be a local area network (LAN) or a wide area network (WAN). In another embodiment, the network 614 may be a hotspot service provider network. In another embodiment, the network 614 may be an intranet. In another embodiment, the network 614 may be a GPRS (General Packet Radio Service) network. In another embodiment, the network 614 may be any appropriate cellular data network or cell-based radio network technology. In another embodiment, the network 614 may be an IEEE 802.11 wireless network. In still another embodiment, the network 614 may be any suitable network or combination of networks. Although one network 614 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A processor-readable medium tangibly storing processor-executable insurance voice authorization instructions for
processing an application for a first insurance policy covering an applicant, wherein the application is received while the applicant is being processed for an unrelated financial services product that requires a type of insurance provided by the first insurance policy;
receiving, during the processing, an oral indication from the applicant responsive to an authorization request prerequisite to issuance of a temporary insurance policy wherein authorization is recorded and is sufficient to satisfy applicable regulatory requirements;
issuing the temporary insurance policy;
performing at least one operation intended to facilitate an underwriting of the first insurance policy, wherein the at least one operation is an operation that requires explicit authorization from the applicant;
underwriting the first insurance policy; and
issuing the first insurance policy.

2. The medium of claim 1, wherein the applicable regulatory requirements are defined by a state.

3. The medium of claim 1, wherein the recorded authorization is archived and maintained for at least seven years.

4. The medium of claim 1, wherein the oral indication is received during an interaction with a customer service representative (CSR).

5. The medium of claim 4, wherein the interaction is facilitated through at least one of the following: public switched telephone network (PSTN), Voice over Internet Protocol (VoIP), voice-enabled instant message chat and voice-enabled web session.

6. The medium of claim 4, wherein the interaction is an asynchronous interaction and the oral indication is recorded by the applicant and delivered to the CSR.

7. The medium of claim 1, wherein the insurance policy is a life insurance policy.

8. An insurance voice authorization processor-implemented method, comprises:
processing an application for a first insurance policy covering an applicant wherein the application is received while the applicant is being processed for an unrelated financial services product that requires a type of insurance provided by the first insurance policy;

receiving, during the processing, an oral indication from the applicant responsive to a predetermined prerequisite to issuance of a temporary insurance policy, wherein the oral indication is recorded and is sufficient to satisfy applicable regulatory requirements;

issuing the temporary insurance policy;

performing via a processor at least one operation intended to facilitate an underwriting of the first insurance policy, wherein the at least one operation is an operation that requires explicit authorization from the applicant;

underwriting the first insurance policy; and issuing the first insurance policy.

9. The method of claim 8, wherein the oral indication is an authorization to issue the insurance policy.

10. The method of claim 9, wherein the authorization is archived and maintained for at least seven years.

11. The method of claim 8, wherein the oral indication is received during an interaction with a customer service representative (CSR).

12. The method of claim 11, wherein the interaction is facilitated through at least one of the following: public switched telephone network (PSTN), Voice over Internet Protocol (VoIP), voice-enabled instant message chat and voice-enabled web session.

13. The method of claim 11, wherein the interaction is an asynchronous interaction and the oral indication is recorded by the applicant and delivered to the CSR.

14. The method of claim 8, wherein the insurance policy is a life insurance policy.

15. An insurance voice authorization system, comprises:
   a memory; and
   a processor disposed in communication with the memory and configured to issue processing instructions stored in the memory, wherein the processor issues instructions to:
      process an application for a first insurance policy covering an applicant, wherein the application is received while the applicant is being processed for an unrelated financial services product that requires a type of insurance provided by the first insurance policy;
      receive, during the processing, an oral indication from the applicant responsive to a prerequisite to completion of processing of a temporary insurance policy, wherein the oral indication is recorded and is sufficient to satisfy applicable regulatory requirements;
      issue the temporary insurance policy;
      perform at least one operation intended to facilitate an underwriting of the first insurance policy, wherein the at least one operation is an operation that requires explicit authorization from the applicant;
      underwrite the first insurance policy; and
      issue the first insurance policy.

16. The system of claim 15, wherein the oral indication is an authorization to complete processing of the application.

17. The system of claim 16, wherein the authorization is archived and maintained for at least seven years.

18. The system of claim 15, wherein the oral indication is received during an interaction with a customer service representative (CSR).

19. The system of claim 18, wherein the interaction is facilitated through at least one of the following: public switched telephone network (PSTN), Voice over Internet Protocol (VoIP), voice-enabled instant message chat and voice-enabled web session.

20. The system of claim 18, wherein the interaction is an asynchronous interaction and the oral indication is recorded by the applicant and delivered to the CSR.

21. The system of claim 15, wherein the insurance policy is a life insurance policy.

* * * * *

UNITED STATES PATENT AND TRADEMARK OFFICE
CERTIFICATE OF CORRECTION

PATENT NO.       : 8,234,191 B1
APPLICATION NO.  : 12/030243
DATED            : July 31, 2012
INVENTOR(S)      : Michael Roger Baublit It is certified that error appears in the above-identified patent and that said Letters Patent is hereby corrected as shown below:

On the title page,
In the Assignee item (73): please delete "United States Automobile Association (USAA), San Antonio, TX (US)" and insert --United Services Automobile Association (USAA), San Antonio, TX (US)--

Signed and Sealed this
Fourth Day of March, 2014

Michelle K. Lee
*Deputy Director of the United States Patent and Trademark Office*